United States Patent [19]

Sanders, Jr. et al.

[11] 4,135,156
[45] Jan. 16, 1979

[54] SATELLITE COMMUNICATIONS SYSTEM INCORPORATING GROUND RELAY STATION THROUGH WHICH MESSAGES BETWEEN TERMINAL STATIONS ARE ROUTED

[75] Inventors: Royden C. Sanders, Jr., Wilton, N.H.; Martin R. Richmond, Lexington, Mass.; Alfred J. Cann, Wilton, N.H.

[73] Assignee: Sanders Associates, Inc., Nashua, N.H.

[21] Appl. No.: 481,015

[22] Filed: Jun. 20, 1974

[51] Int. Cl.² ............................................ H04B 7/20
[52] U.S. Cl. .............................................. 325/4
[58] Field of Search ............ 325/3, 4, 15, 64, 62, 325/63; 343/100 ST, 200; 179/15 BV, 15 FD, 18 R; 340/46.1 S

[56] References Cited

U.S. PATENT DOCUMENTS

| | | | |
|---|---|---|---|
| 3,315,164 | 4/1967 | Ferguson, Jr. et al. | 325/4 |
| 3,534,264 | 10/1970 | Blasbalg et al. | 179/15 BV |
| 3,842,350 | 10/1974 | Gross | 325/4 |
| 3,928,804 | 12/1975 | Schmidt et al. | 325/4 |
| 4,004,098 | 1/1977 | Shimasaki | 325/4 |

OTHER PUBLICATIONS

IBM Technical Disclosure Bulletin; vol. 10, No. 1, Jun. 1976, pp. 22-24, "Central Control Facility for a Satellite Communication System."

*Primary Examiner*—Benedict V. Safourek
*Attorney, Agent, or Firm*—Louis Etlinger; Joseph E. Funk

[57] ABSTRACT

A satellite relay communications system includes a ground relay station arranged so that each message from one subscriber to another is relayed by the satellite relay to the ground relay, processed by the ground relay and then transmitted to the second subscriber by way of the satellite relay. Processing at the ground relay station includes a switching function in which the carrier frequency of each message is changed from the frequency used for transmitting by the subscriber sending each message to the frequency used for reception by the subscriber to whom the message is addressed. This permits each subscriber to use a single transmitting frequency and a minimum number of receiving frequencies.

26 Claims, 9 Drawing Figures

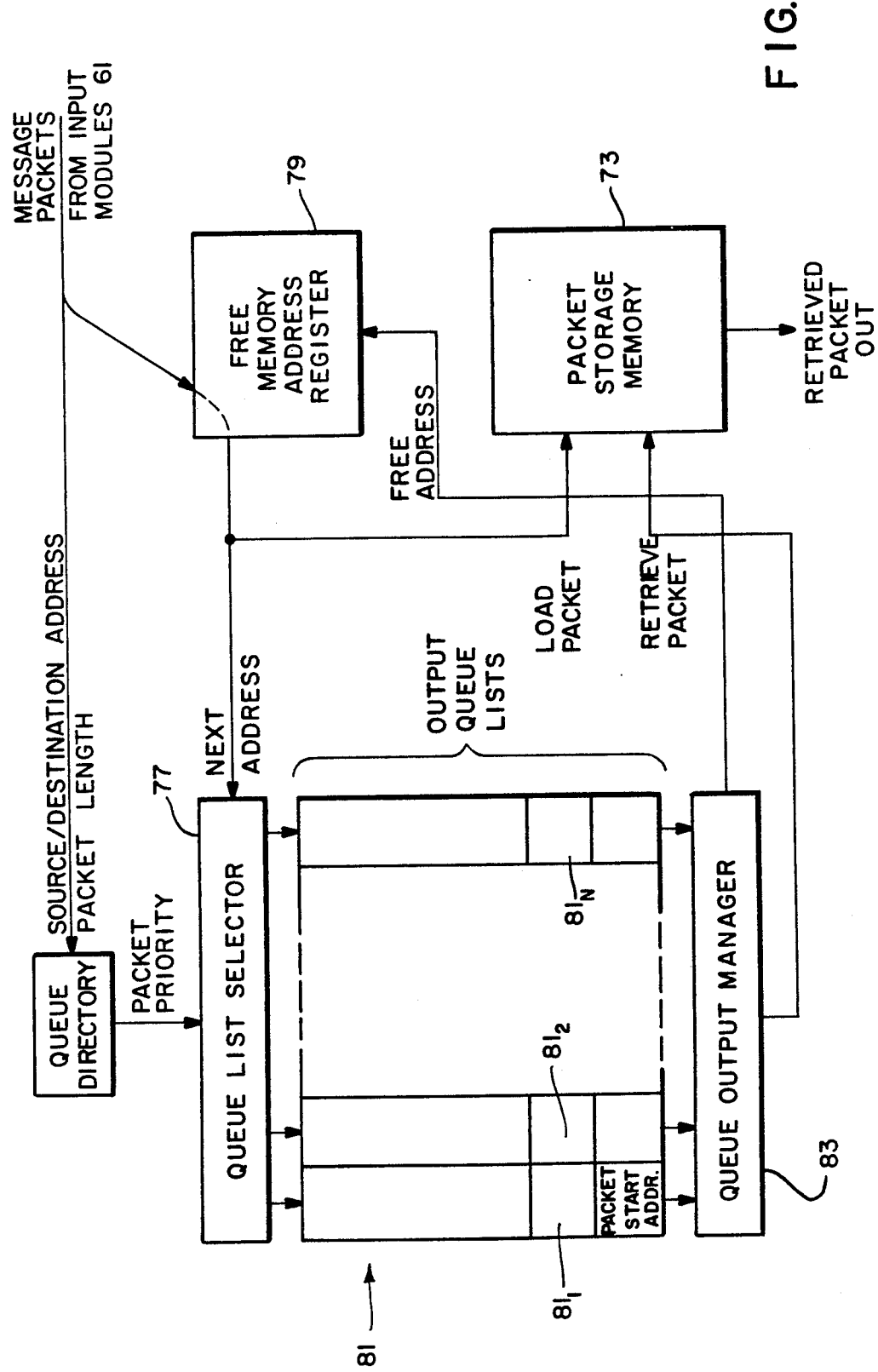

SATELLITE COMMUNICATIONS SYSTEM INCORPORATING GROUND RELAY STATION THROUGH WHICH MESSAGES BETWEEN TERMINAL STATIONS ARE ROUTED

FIELD OF THE INVENTION

This invention relates to a point-to-point communication system employing a synchronous earth satellite as a relay vehicle.

BACKGROUND OF THE INVENTION

Synchronous satellites have been employed for a number of years as relay stations for communications between various points on the earth's surface. Their use facilitates communication at microwave frequencies where very broad-band operation and resulting large channel capacities are attainable, but which, on the other hand, require essentially line-of-sight transmission paths for acceptable reliability. Non-synchronous satellites have been and still are used as communications relay vehicles. However, synchronous satellites, which are positioned at fixed points above the Equator, are generally preferred because they are essentially stationary with respect to the earth's surface. Thus they need not be tracked by the ground station antennas, nor do they require compensation for doppler shifts, which are encountered with the non-synchronous satellites.

Moreover a single synchronous satellite can serve as a relay whereas, if non-synchronous satellites are used in the same application, a number of them are required because each one is continuously moving into or out of range of the ground stations. We shall therefore describe the present invention in terms of synchronous satellites, although it should be understood that the invention is also applicable to non-synchronous satellite systems.

In one presently operating satellite relay system the satellite carries several transponders, i.e. broad-band amplifiers and frequency translators, which amplify the signals received from earth stations and re-transmit the signals toward the earth for reception by other earth stations. Because of its broad-band capability each transponder can accommodate simultaneous transmissions in a relatively large number of communications channels having different carrier frequencies.

With this arrangement, each terminal station on the ground is constructed with the capability of transmitting and receiving in each of the channels. Each time a terminal station is to begin a transmission, an unused channel is assigned as a communications path between that station and the terminal station that is to receive the transmission. In one proposed system, channel assignment is accomplished by means of a ground control station that keeps track of the unused channels and assigns them on demand to stations that are about to commence message transmissions. The control station, which does not itself participate in the transmission of messages between the terminal stations, is "connected" to the terminal stations by a designated channel that serves as an "order wire."

A system presently in use, known as the SPADE system, differs from the foregoing one in that each of the terminal stations keeps track of all the unused channels and selects one itself when it is about to commence transmission. A control station is still used, but in this case its only function is to ascertain when two terminal stations have selected the same channel and, in such cases, cause the terminal stations to make new selections.

Two characteristics of these systems are of particular significance in connection with the present invention. The first of these, whose relevance will become apparent from the ensuing description, is that the maximum number of subscribers that can transmit at any given time exactly equals the number of available channels. The number of available channels is a limitation imposed by the ratio of (a) the total power that can be transmitted by the satellite transponders to (b) the required power per channel. The transponders have a bandwidth limitation and optimum design considerations dictate that this limitation is reached at the point that the maximum output power is reached. Thus the bandwidth corresponds exactly to the channel spacing multiplied by the number of channels.

In practice this imposes an absolute limit on the number of channels in a given system. Generally only a fraction of the terminals will have messages to transmit at any given time. Therefore, the total number of subscribers can be substantially greater than the number of available channels. However, on occasion all the channels will be in use simultaneously and the system will then be operating at full capacity. If a ground terminal then requests assignment of a channel for message transmission, the request must be denied. Either the number of subscribers must be severely limited to make this a very rare occurrence or the terminal stations must be provided with equipment for storing blocked messages during intervals in which there are no available channels.

The second characteristic is the relatively high cost of each of the terminal stations. This tends to limit the number of terminal stations, with a large number of subscribers being connected to each such station. As a result, a substantial part of the operating cost of the system involves lengthy ground links, either by wire or microwave, between the subscribers and the terminal stations. The principal object of the present invention is to reduce the cost of the terminal stations and increase their number so as to reduce the lengths of the ground links and thereby effect a material reduction in the overall expense.

SUMMARY OF THE INVENTION

In contrast with prior systems we employ a "two-hop" arrangement in which each transmission from a terminal station is first relayed by the satellite relay to a central ground control station where certain processing takes place and then it is routed back through the satellite to the receiving terminal stations. As explained below, each terminal station can therefore transmit in a single, unique channel and also receive in a single channel. The ground control station in effect "switches" each message from the channel in which it is first transmitted by a message-originating terminal station to another channel in which it is to be received by the terminal station to which it is addressed.

Certain advantages of the arrangement will be readily understood even without explanation. For example, central switching at the ground control station is substantially less expensive than providing each terminal station with the full channel-switching capabilities characteristic of prior systems. Moreover, the system provides completely flexible connectivity between terminal stations covered by different satellite antennas; in prior systems, "inter-beam" connectivity is either fixed or a limited degree of flexibility is accomplished by switching in the satellite itself at substantial expense and at the cost of reliability.

Also our invention makes it possible to use one signal format for transmissions from the terminal stations and an entirely different format for the signals received by these stations. The significance of this arrangement will be explained later in detail. The foregoing features all contribute to low system cost, as do several other attributes described below, namely, the ability to accommodate system growth and attainment of lower effective losses in the signal paths between the terminal stations.

GENERAL DESCRIPTION OF THE INVENTION

In the first "hop" of each transmission, i.e. from the message-originating terminal station to the control station, the system operates on a frequency-division multiplex (FDM) basis, with each terminal station being assigned exclusively to its own transmitting channel. In the simplest embodiment of the invention, the control station preferably sorts all incoming packetized messages from the transmitting terminal stations into groups that correspond to and are directed to specific geographically close groups of terminal stations and retransmits the sorted messages on a first-in-first-out basis to the receiving terminal stations. This achieves a different signal format for retransmission, i.e. a time-division multiplex (TDM) arrangement. All terminal stations thus receive in a single channel and select the messages addressed to them be means of an identification code that is transmitted at the beginning of each message packet.

In the expanded system specifically described herein, the terminal stations are arranged in groups that are usually geographically close to each other, with each group being assigned a different channel or frequency for receipt of messages relayed by the control station. Within each group the system operates as described above. That is, the messages relayed to the terminal stations within the group are transmitted on a time-division multiplex basis for that group.

Preferably the system operates in the X-band region, i.e. the 12GHz and 14GHz bands already assigned by governmental authorities to satellite relay systems. This minimizes the problem of accomodating the locations of the terminal stations to pre-existing ground-based microwave systems, which operate on different frequencies. By contrast, the present C-band satellites share frequencies (4 and 6 GHz) with terrestrial microwave links.

Use of X-band also permits higher antenna gain to be achieved for a given size antenna on the satellite. Such high gain antennas provide a higher effective radiated power and thereby reduce the required ground station antenna size. The high gain also implies a smaller beam diameter, necessitating multiple beams to provide equivalent coverage.

In the limit — very small diameter, high gain satellite beams could be used, allowing for further reduction in the ground station receiver antenna. The only reasonable way to provide connectivity among ground stations in different beams is by use of a two hop relay station. Otherwise, the inefficiency of multiplexing via filtering in the satellite becomes prohibitively expensive, heavy, and inefficient in use of spectrum, because filtering requires guard bands.

In fact, the three beam satellite described herein represents almost an upper practical limit to achieving such connectivity via filtering in the satellite alone.

On the other hand use of X-band results in substantially more signal degradation due to atmospheric disturbances than is encountered in the C-band. In particular, a heavy rainstorm may cause severe attenuation of the signals to and from one or more of the terminal stations. This attenuation can be overcome by always using sufficient effective transmitted signal energy to provide the requisite signal-noise ratio for the desired error rate and in fact, we prefer to make all transmissions from the terminal stations to the control station at this relatively high energy level. However, we use a different arrangement for the second-hop transmissions from the control station.

Specifically, the control station increases signal energy, by transmitting the digitized packetized messages at slower rates, to those terminal stations in transmission paths degraded by atmospheric conditions. For example, the second-hop transmissions from the control station might be at a maximum data rate for those terminal stations having insubstantial signal path degradation, one-half that rate, with a corresponding increase in effective signal-noise ratio, for stations for which there has been a reduction of signal noise ration below a first predetermined value, and a further data rate reduction for those stations suffering from signal path degradation beyond a further predetermined value.

The condition of each of the transmission paths is readily sensed at the control station, since each terminal station tranmission passes through that station. Where each terminal station transmits frequently enough for the control station to follow changes in the propagation characteristics associated with that station, the control station can merely monitor the levels of the signals received during regular message transmissions. If any of the terminal stations does not have any traffic to send for an excessive time, it can automatically send a "status" message just to the control station so as to develop the desired information.

The advantage of this "rain management" system stems from the fact that the most important limitation on the capacity of the satellite itself is the weight of the equipment that supplies power to the transponders. A material increase in transponder output power requires a significant increase in power supply weight, and correspondingly, a very substantial increase in cost. If all transmissions from the ground control station were to be made at the effective signal energy level required for the most adverse propagation conditions, the channel capacity would have to be significantly limited to keep the cost of the satellite within reasonable bounds. Conversely, by increasing signal energy only for those transmissions for which it is required, we provide the satellite with a greater channel capacity than it would otherwise have.

If an FDM format is used in the second-hop, the transmitted power will be adjusted according to propagation conditions to increase signal energy.

The important advantages of our system will become more apparent from a specific example. Assume that for the first hops from the terminal stations to the ground control station the satellite is provided with an FDM transponder having a bandwith accommodating 1500 channels or frequencies, one channel per terminal station. Assume further the transponder has sufficient power capability to relay transmission in 500 channels simultaneously with sufficient power per channel to provide essentially error-free transmission to the control station. Also, assume that the number of subscribers is such that rarely will there be more than 500 transmissions in progress at any one time.

However, 500 is not an absolute maximum of the number of channels in simultaneous use. The transponders in our system are not limited to a bandwith corresponding to their maximum power output. Thus, with 500 channels in operation, the satellite can still accommodate a 501st transmission, though with a minute decrease in signal-noise ratios in the signals received by the control station. Simularly, a substantial number of additional transmissions can be added on an intermittent basis without undue signal degradation.

With this arrangement, the terminal stations are less costly and system control is simpler because (a) each one transmits on only one carrier frequency and (b) each terminal station can transmit at will, i.e. it does not have to check with a control station before each transmission for assignment of an idle channel and it does not have to store messages because of blocked transmissions.

In our system one may use a similar frequency-division arrangement for the second hop from the control station to the terminal stations receiving the transmissions. In that case each terminal station is assigned a unique receiving channel, with advantages similar to those obtained from the frequency-division arrangement in the first hop. However, time-division multiplex (TDM) has certain advantages that make it more desirable and the preferred embodiment disclosed herein is a TDM system for the second-hop transmission.

Specifically, the transponders in the satellite are characterized by substantial non-linearity when operated at full rated power. This causes inter-modulation distortion when a transponder operates at or near full power in wide-band multiple-channel operation. Accordingly, the transponder used for the first hop is operated at well below its maximum power capability to keep inter-modulation noise at an acceptable level.

On the other hand, when a transponder passes only a single transmission channel at any given time, as in time-division multiplex arrangements, distortion is a negligible problem and the full power capability of the transponder can therefore be utilized, with a corresponding increase in channel capacity for a given error rate. It is for this reason that we prefer to use time-division multiplex for the second-hop transmissions from the control station to the terminal stations receiving the various messages.

It should be noted that whether frequency-division or time division is used for the transmissions from the control station, each terminal station needs to receive only one carrier frequency in the simplest case, and only three carrier frequencies in the system specifically described herein. This again makes for low cost in the terminal stations.

Because of the critical limitations on weight of the equipment carried in the satellite, the required signal-noise ratio for transmissions through the satellite must be provided mainly through relatively high effective radiated power in the ground transmitters and relatively high sensitivity in the ground receivers. Specifically, high effective power in the satellite is extremely costly, as noted above; so also is high sensitivity, since this requires, among other things, a large antenna and a low noise figure.

In the prior "one-hop" satellite relay system the tendency has been to design "downlink limited" systems, i.e., the major noise contribution comes from the ground receiver and very little from the satellite receiver. This requires using relatively high ground transmitter power, typically 6 dB more than would be required to make the noise on the two links equal. This choice is made because the extra transmitter power is cheaper than a corresponding increase in either satellite or ground receiver sensitivity.

In our system, on the other hand, we obtain a high signal-noise ratio by using both a high-sensitivity receiver at the end of the first hop, i.e. at the ground relay station, and high-power transmissions at the beginning of the second hop, again at the ground relay station. Thus, for each hop the expensive equipment is located at the ground relay station. This permits the use of much higher performance equipement, and at substantially lower cost, than if either higher transmitter power or higher receiver sensitivity were to be incorporated into all the individual ground terminal stations.

In this connection we note that the signals received by the ground control station at the end of the first hop are demodulated and decoded, then re-encoded before retransmission on the second hop. We thus avoid adding the noise encountered in the two hops. Consequently, the error rate for the two hops is only double the error rate for a single hop, i.e. approximately $10^{-7}$, whereas, without ground control station decoding, the error rate would be that corresponding to 3 dB more noise, about 1000 times the single hop rate.

Because the terminal stations are thus relatively inexpensive, small and easy to install, a large number of then can be used. In fact, in regions characterized by high traffic densities they may be only a few miles apart. This results in a very low cost for the link between each subscriber and the nearest terminal station, making for an overall message unit cost that is substantially less than that of prior systems.

BRIEF DESCRIPTION OF THE DRAWINGS

FIG. 6 is a simplified block diagram of a priority queue arrangement that be included in the data management portion of FIG. 5;

DETAILED DESCRIPTION OF THE INVENTION

Figure 1:
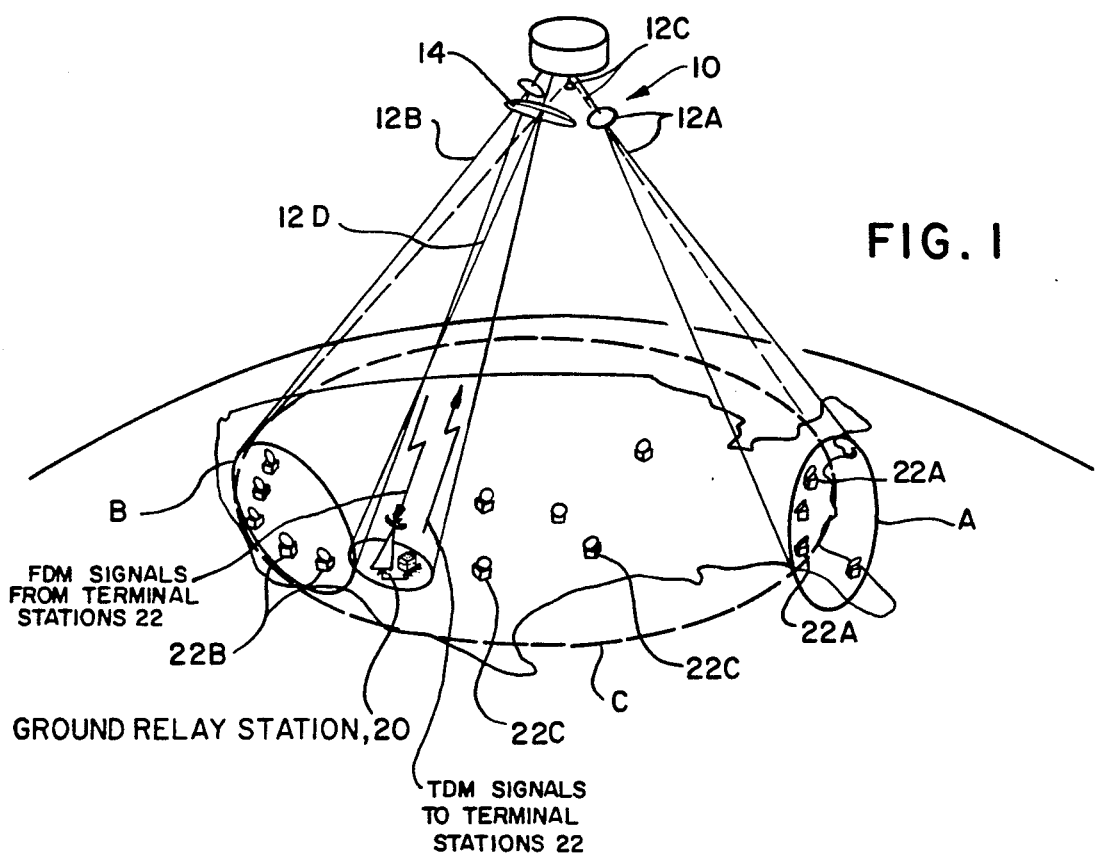
FIG. 1 is a conceptual diagram of a communications system embodying the invention.

FIG. 1 we have illustrated the application of the invention to a communications system covering the continental United States. A satellite relay 10 in synchronous orbit has an antenna 12A covering the United States East Coast with a spot beam A, and an antenna 12B covering the West Coast with a spot beam B. A third antenna 12C has a broad beam C covering essentially the entire continental United States. Additionally, FIG. 1 includes a fourth antenna 14 that provides a very narrow spot beam D for communication with a ground relay station 20, although one of the other antennas can be used for this link. The system also includes ground terminal stations 22 to which the subscribers are connected either by wire, e.g. telephone, or by wireless links. The transmissions between each of the terminal stations 22 are by way of one of the satellite antennas 12A, 12B and 12C, the letter suffixes of each of the reference numerals 22 indicating which of the satellite antennas is involved with that terminal station.

As described above, and in accordance with the teaching of our invention, all communications between terminal stations are accomplished in two "hops." For example, if a terminal station 22A on the East Coast is to transmit a message to a terminal station 22B on the West Coast, the transmission will involve a first hop extending from the transmitting station to the satellite antenna 12A and then down to the ground relay station 20 by way of the satellite antenna 14. The transmission is completed by means of a second hop extending from the relay station 20 to the satellite antenna 14 and from the satellite antenna 12B to the receiving station 22B. It should be understood that the arrangement and configurations of the various satellite antenna beams are not part of the invention. They depend primarily on the traffic densities in the various regions covered by the system.

We shall now proceed with a more detailed description by following the transmission of messages through the system. Immediately hereinafter the operation of the terminal stations 22 and the satellite is given in detail with only a general description of the ground relay station 20 to functionally tie everything together. A detailed description of station 20 is given further in the specification.

Figure 2:
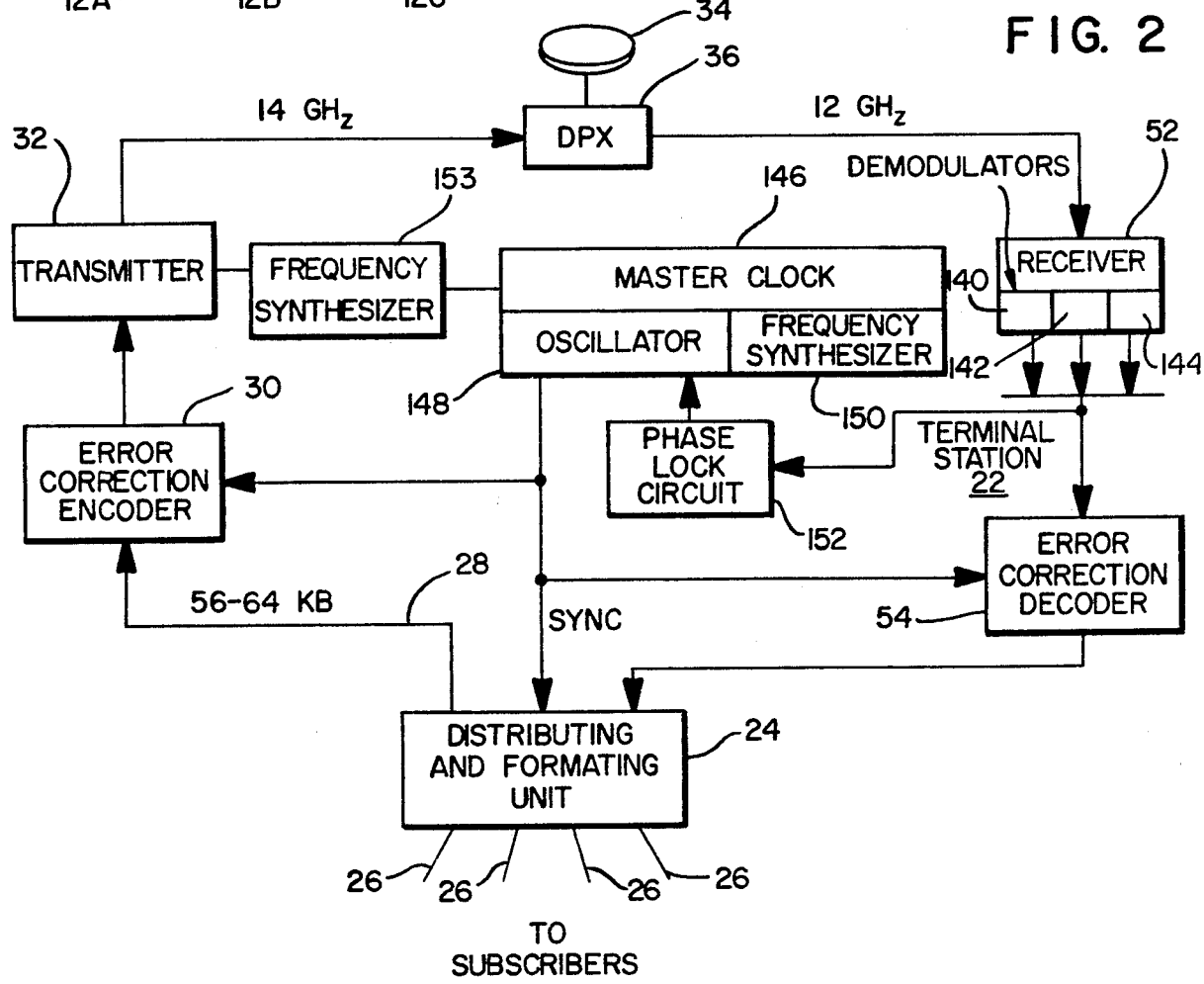
FIG. 2 is a detailed block schematic diagram of a terminal station.

As shown in FIG. 2, the subscribers associated with each terminal station 22 are connected to a distribution and formating unit or "communications processor" such as known in the electronic switching system art and generally indicated at 24. For incoming messages the unit 24 includes conventional circuitry for receiving relatively slow transmissions on subscriber lines 26 and assembling them as packetized messages on a time division multiplex basis for retransmission on an outgoing line 28. For example, the subscriber data rate may be 2,400 bits per second which is converted to a basic data rate of 56 kilobits per second on the line 28. The unit 24 also applies a predetermined format to the data, as described in detail below and this, plus housekeeping and maintenance procedures, may increase the rate to 64 kilobits per second on the line 28. The messages are then passed through a forward error correction encoder 30, a rate one-half encoder in the present example, with a resulting rate of 128 kilobits per second being output from the encoder.

The encoded data stream is applied to a transmitter 32 whose output is fed to an antenna 34 by way of a diplexer 36. Each of the terminal stations 22 is assigned a unique tranmission channel in the 14GHz frequency band. Assuming a center-to-center spacing of approximately 160KHz and a total of 1500 terminal stations, there will thus be an approximately 240MHz band required for transmissions from all the terminal stations 22. Referring for the moment back to FIG. 1, this 240MHz band is divided into sub-bands assigned to the respective satellite antennas 12A, 12B and 12C, and each sub-band has individual channels assigned one per terminal station. Thus the channels assigned to the terminal stations 22A, for example, will be within a sub-band assigned to the antenna 12A.

Figure 3:
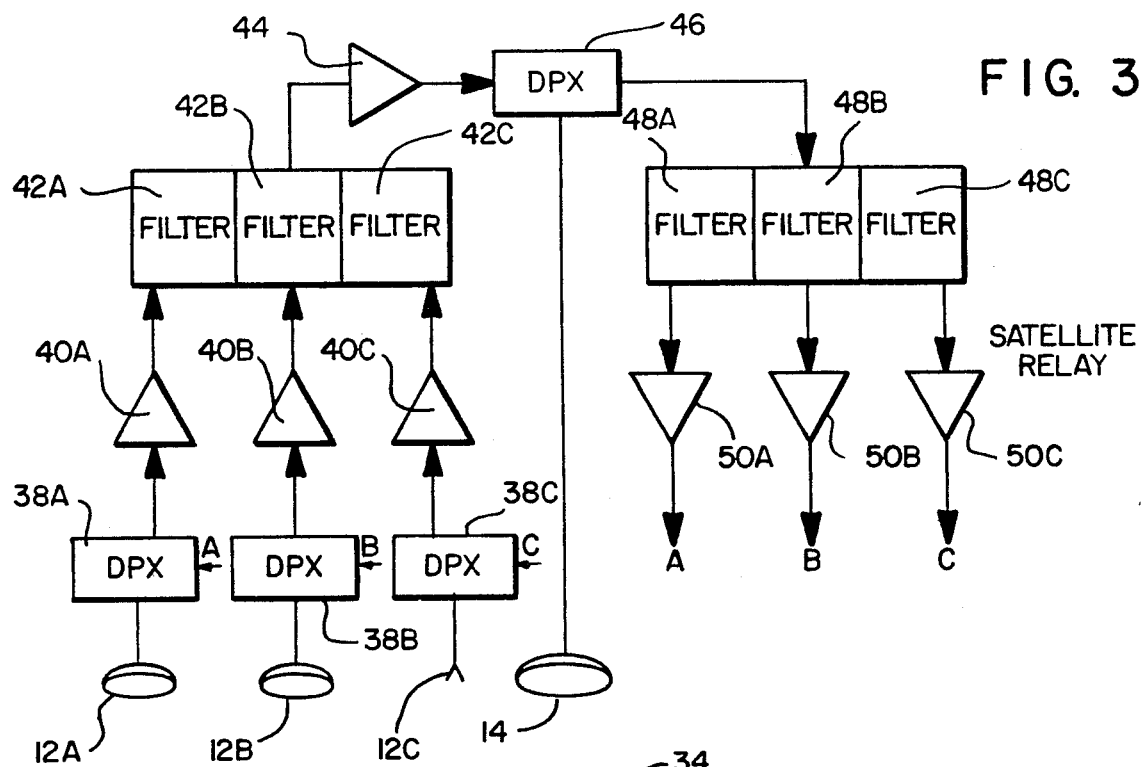
FIG. 3 is a detailed block schematic diagram of the portion of the system carried in the satellite.

As shown in FIG. 3, the signals received by the satellite relay antennas 12A, 12B and 12C are passed through diplexers 38A, 38B and 38C to preamplifiers 40A, 40B and 40C. The outputs of the amplifiers in turn are passed through filters 42A, 42B and 42C having pass bands corresponding to respective sub-bands and the filter outputs are combined as the input for a transponder 44.

The filters 42 prevent the noise in each sub-band from being added to the signals in the other sub-bands. The amplifiers 40 boost the incoming signal levels so that the insertion losses in the filters 42 will not materially affect signal-to-noise ratio.

The transponder 44 is essentially a broad-band power amplifier including a frequency-changing capability, such as found in any receiving equipment, for converting the signals to the 12GHz band. The output of the transponder 44 passes through a diplexer 46 to the antenna 14 for transmission down to the ground relay station 20 (FIG. 1).

As described in detail below, the ground relay station 20 sorts all the incoming message packets according to destination and retransmits them. Specifically, it sorts the messages according to which of the three satellite beams A, B and C, each associated with a geographical group of the terminal stations 22, as shown in FIG. 1 are to be used to retransmit the sorted messages to reach the subscribers who are to receive the respective messages. The serted signals for each of the three beams are retransmitted in a separate frequency channel on a time-division multiplex (TDM) basis, as contrasted with the FDM arrangement for transmissions from the terminal stations 22. Station 20 is discussed in detail further in the specification.

While further reference to FIG. 3, the second-hop re transmissions from the ground relay station 20 are received by the satellite antenna 14. From the antenna 14 they pass through the diplexer 46 to a set of filters 48A, 48B and 48C whose pass bands coincide with the three transmission channels A, B and C of the ground relay station. The outputs of these filters are applied to transponders 50A, 50B and 50C which amplify the signals and also convert them in frequency from the 14GHz band to the 12GHz band. Finally the outputs of the transponders 50 are applied to the respective diplexers 38A, 38B and 38C for transmission via antennas 12A, 12B and 12C.

As diagrammed in FIG. 2, each of the terminal stations 22 receives transmissions from the satellite relay in the assigned one of the three frequency channels A, B or C by way of its antenna 34. The output of the antenna passes through the diplexer 36 to a receiver 52. The demodulated outputs from the receiver 52 are passed through an error correction decoder 54 whose output in turn in fed to the distribution and formating unit 24. The unit 24, which responds to those message packets having addresses designating subscribers connected to that terminal station, distributes such messages to those subscribers. Other message packets are disregarded.

Figure 4:
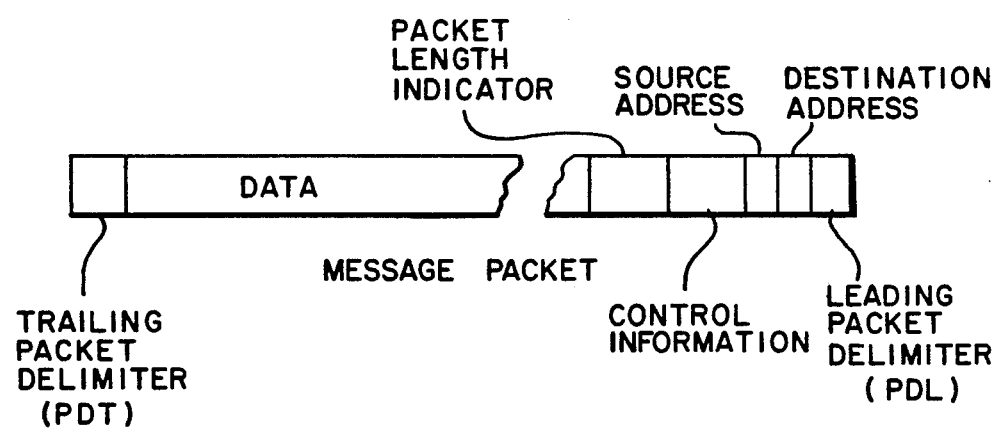
FIG. 4 shows the format of a data packet.

In the preferred embodiment of the system, messages are handled in what is usually called "packet" form. This is, each message is divided into bit strings having one or more standard lengths and a uniform format. For example, as illustrated in FIG. 4, each packet may begin with a leading packet delimiter (PDL) designating the beginning of the packet, followed by a header comprising (a) the destination address, i.e. identification of the subscriber who is to receive the message; (b) the source address, identifying the subscriber initiating the message; (c) a control information block (optional); and (d) a packet length indicator (optional). Next is a string of data containing all or part of a message, and finally the packet ends with a trailing packet delimiter (PDT) indicating the end of the packet. The destination address includes a set of bits designating the subscriber who is to receive the message, a second set of bits designating the terminal station 22 connected to the destination subscriber and a further set of bits designating the group (A, B or C) to which that terminal station belongs. The control data block (if any) contains information peculiar to the system, not to a customer, e.g. performance monitoring, designation of extra transmissions to measure rain attenuation, etc.

The packet length indicator can, of course, be omitted if a uniform packet length is to be used. Depending on the type of circuitry used to detect the beginnings and ending of packets, it can also be omitted in multiple-packet-length systems. Because of their importance in system operation, the packet delimiters and headers are preferably provided with additional forward error correction encoding within the packet to further reduce the incidence of error for these items.

The circuitry for putting messages into the desired packet form for transmission and reconverting the received packets to data strings is well known in the data transmission art and may be situated at the respective terminal stations 22 and specifically in the distributing and formating units 24 as indicated in FIG. 2. Alternatively these functions may be accomplished in the subscriber's equipments, an arrangement which may be more desirable if a number of different standard packet lengths are to be accommodated in the system.

As mentioned above, atmospheric disturbances, especially heavy rain storms, may cause substantial localized signal attenuation. Undue signal degradation can, of course, be avoided by using sufficient transmitter power (or, equivalently, sufficiently slow transmission rates) to ensure a suitable signal-noise ratio under all conditions. However, this reduces the capacity of the system unnecessarily, since (a) only a few of the terminal stations may be affected by adverse conditions at any given time and (b) there is a practical limit to the total power-handling capability of the transponders in the satellite relay. Accordingly, we monitor the propagation conditions associated with the respective terminal stations 22 either on the ground relay station or elsewhere. When normal conditions are encountered, the communications with a station are run with minimum energy. When the propagation conditions associated with the station deteriorate, the system increases the effective energy for transmissions to that station. If the frequency-division multiplex arrangement is used for transmissions from the ground relay station 20 to the terminal stations 22 the individual carrier power is increased or the data rate is slowed. In the preferred case of time-division multiplex, rather than increase transmission power, an equivalent energy increase is accomplished by slowing down the data rate. In the illustrated embodiment, three different data rates are used, with the fastest one being for normal conditions, a somewhat slower data rate being used for when the atmospheric attenuation exceeds a first level and a third, slower yet, data rate being used when attenuation exceeds a second level.

In a particularly simple arrangement of this system, each of the three channels (corresponding to the satellite beams A, B and C) used for transmissions from the ground control station is divided into three subchannels, having the respective three data rates. The ground relay station 20 then transmits on a given data rate subchannel according to the attenuation conditions associated with the terminal station 22 that is to receive the transmitted data. The manner in which this is accomplished is described in connection with the discussion of FIGS. 7A and 7B.

For transmissions from the terminal stations 22 to the ground relay station 20, a single power level is used, that level being sufficient for satisfactory communication under maximum atmospheric attenuation. However, the system can readily be modified to provide different power levels on command from the ground relay station 20 in response to varying attenuation as monitored by the station 20.

Before going into a detailed description of a specific circuit arrangement that might be used for the ground relay station 20, it will be helpful to consider the basic operation of the station 20 in general terms before going on to a more detailed description of the system. Thus, referring first to the simplified block diagram in FIG. 5, the FDM signals received from all the terminal stations are demodulated and the demodulated signals from all the terminal stations are input on a one to one basis to input modules 61 where the signals are first error-correction decoded, the destination addresses are sensed and flag signals are set to indicate the reception of whole message packets. Other functions may also be performed, depending on the specific details of the system. As indicated by the boxes $61_1$–$61_n$, these functions may be performed by separate equipment for each of the FDM channels used in the first hop transmissions. In an alternative embodiment of the invention the equipment requirements might be reduced by time sharing according to which channels are active at any given time.

Next all the demodulated message packets are multiplexed together to a common bus on a first in time basis as indicated at block 63 and then stored in a common memory facility as indicated at 65. The message packets are retrieved from storage from the common memory on a first in first out basis under an output data control arrangement, indicated block 69, under which they are routed to output equipment according to the destination of the messages for re-encoding, as shown at 71 block, and any other processing that may be required prior to retransmission by of the respective transmitters at the station 20. As indicated at 67 block in FIG. 5, various operations are subject to data flow control in the form of system timing and overall system operation control. Such control may be relaively simple or relatively complex depending on the desired flexibility of the system operation. For example, a relatively simple control can be exercised if all message packets have the same length, message packets for the respective output channels are transmitted on a strictly first-in-first-out basis rather than on a priority basis. On the other hand, more complex flow control is required when multiple packet lengths are to be accommodated by relay station 20, and when data is to be processed and retransmitted from station 20 according to priority instead of a first-in-first-out basis.

Figure 5:
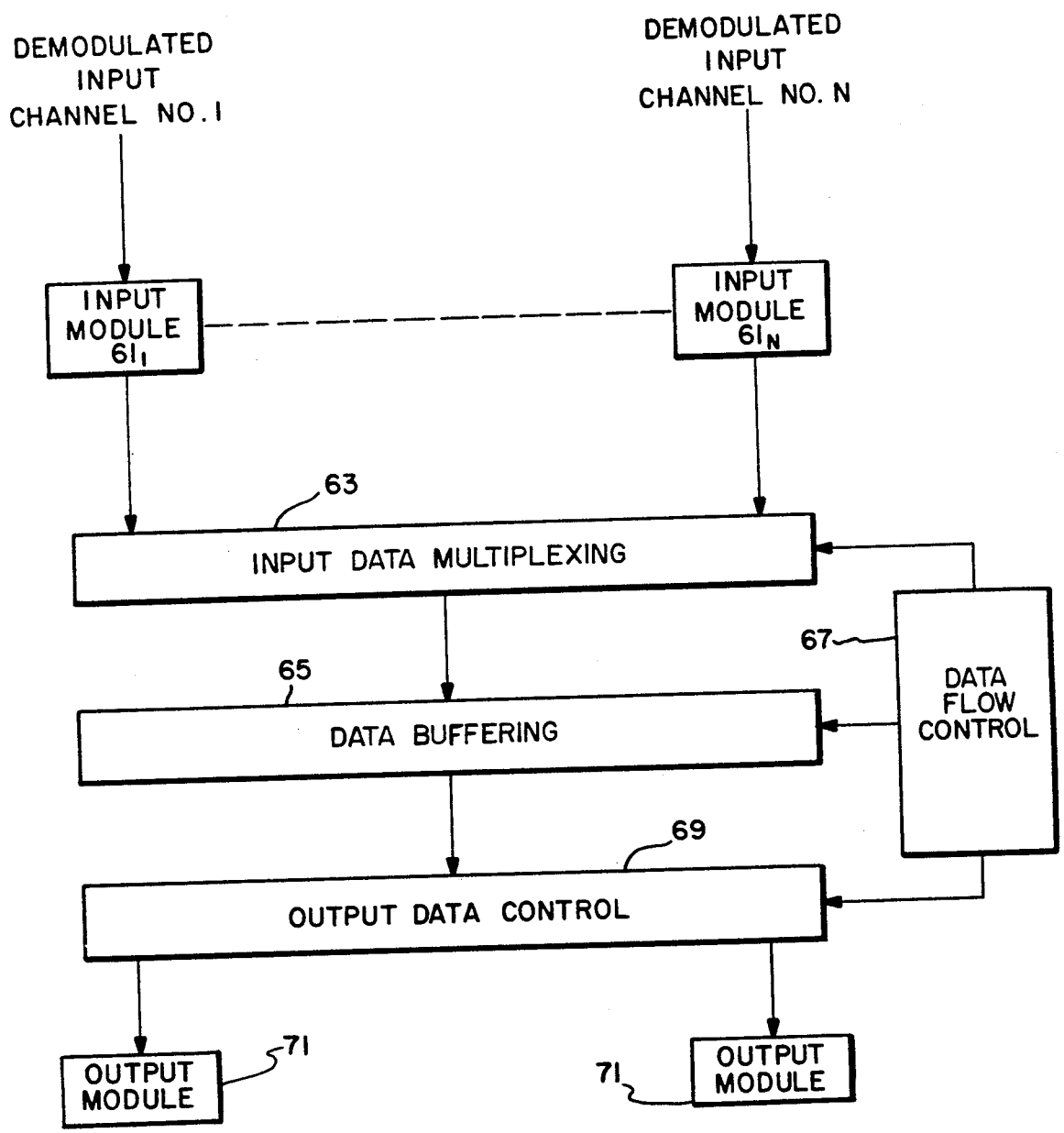
FIG. 5 is a simplified block diagram of the packet handling arrangement in the ground relay station.

FIG. 6 is a generalized schematic diagram of other functions to be accomplished by blocks 65, 67 and 69 in FIG. 5 for an alternative embodiment of our invention providing the aforementioned message priority retransmission. The multiplexed or interleaved incoming message packets from all input modules 61 are stored in a section of memory 73 according to level of priority and then are retrieved from memory 73 in the priority order in which they are to be retransmitted from station 20. To accomplish this the previously discussed control information block of each packet is applied to a queue directory 75, in which is stored priority information, which determines the priority for each packet and applies this priority to a queue list selector 77. At the same time, a register 79, containing a continuously updated list of all free addresses in the memory 73, transmits one of the free addresses to the selector 77 as a next address; it also applies that free address to the memory 73, which the reupon loads the packet into the corresponding location therein. That address is thereupon deleted from the contents of the free address register 79.

The selector 77 then loads the memory addresses of the packet just placed into memory 73 into a queue list register 81 according to the priority transmitted from the queue directory 75 to selector 77. Specifically, the register 81 contains a set of sub-registers $81_1$, $81_2$, etc. corresponding to the respective transmission priorities. Each packet address is loaded into the sub-register corresponding to its priority. Within each priority sub-register $81_1$, $81_2$, etc.; the packet memory addresses are later retrieved on a first-in-first-out basis.

Retrieval of packet addresses from the register 81 is controlled by a queue output manager 83. The manager 83 applies the retrieved addresses to the memory 73 in a well known manner so as to retrieve the respective packets therefrom, these packets then being fed to the output modules 71 by a suitable multiplexing arrangement (not shown in FIG. 6). The queue output manager 83 may be readily constructed or programmed to operate in accordance with any desired set of rules. For example, in the simplest case the manager 83 might be arranged to exhaust the contents of the highest priority sub-register first, then the contents of the register having the next priority, and so on down the line. It might also include a timing arrangement to prevent the retention of data packets of lower priorities beyond a maximum time.

Figure 7A:
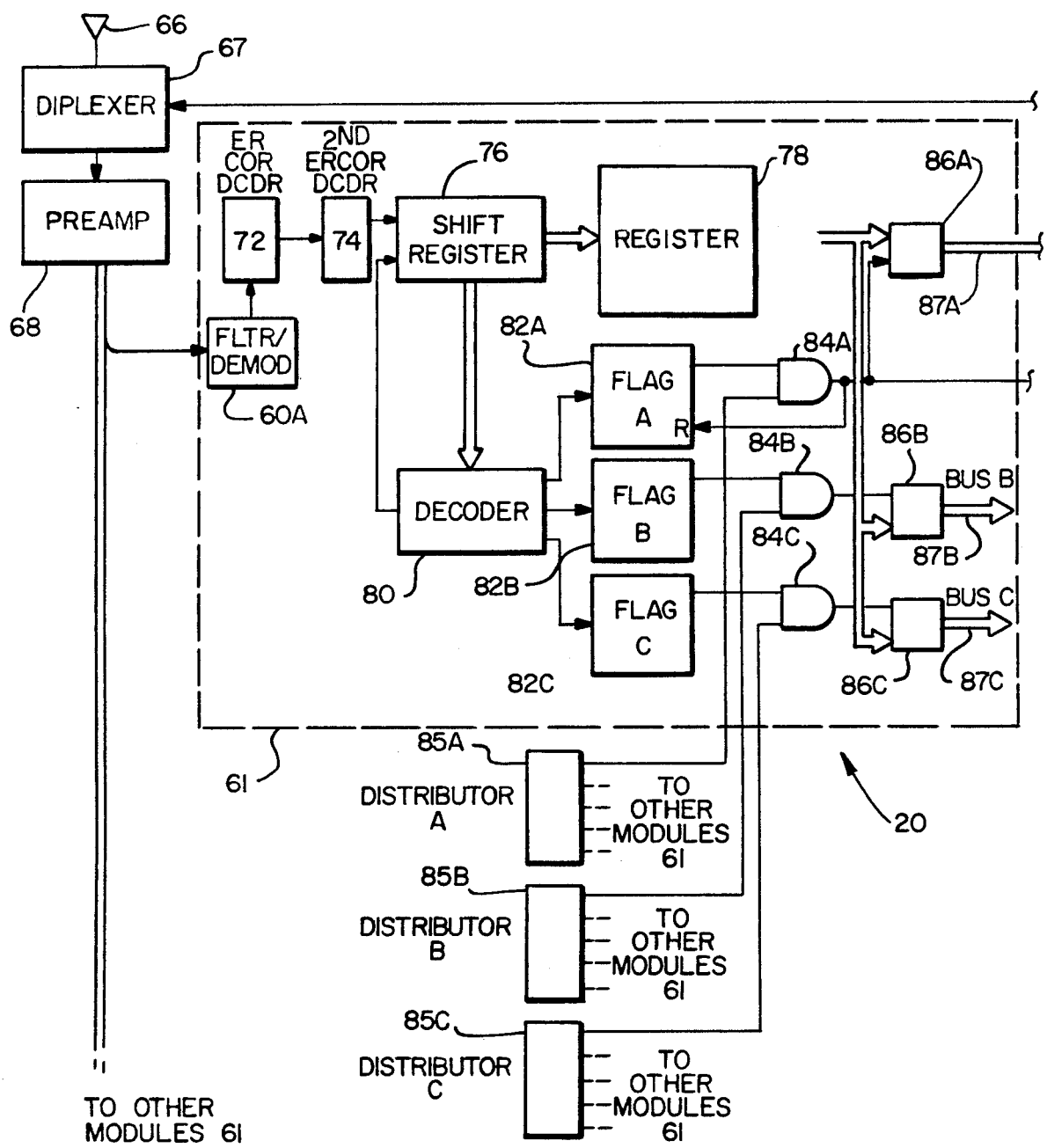
FIGS. 7A and 7B are block diagrams of a ground relay station.
Figure 7B:
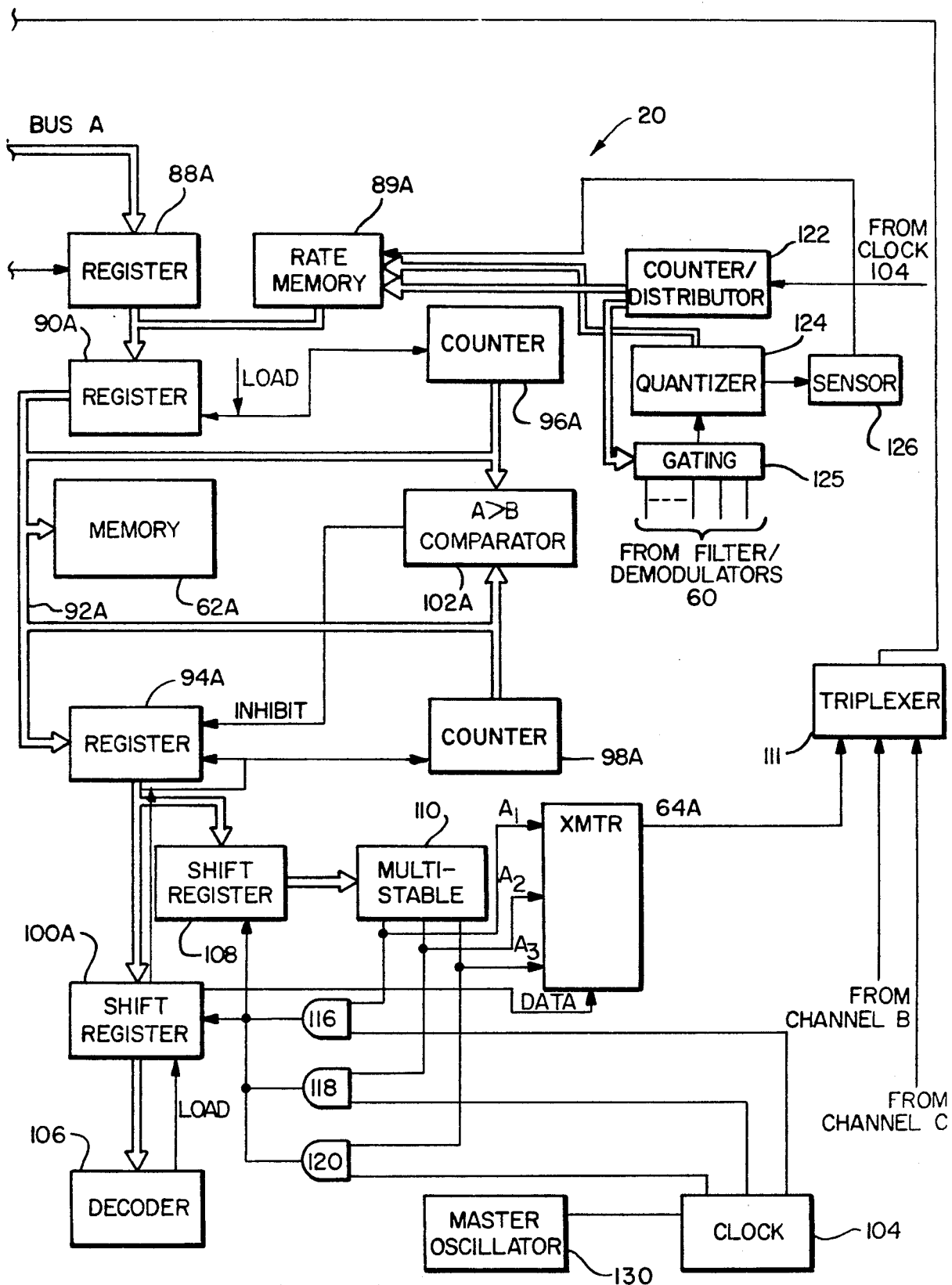

In FIGS. 7A and 7B we have illustrated in detail a ground relay station 20 in accordance with the teaching of our invention which is arranged in accordance with the more general outline of FIG. 5. As mentioned previously with respect to FIG. 5, this embodiment of station 20 uses message packets having a uniform length from all terminal stations 22 and a single priority for message transmission. Thus, the priority queueing arrangement generally outlined in FIG. 6 and discussed previously is not included as it is not part of the preferred embodiment of the invention.

It should be understood that the functions described herein and illustrated in FIGS. 5, 7A and 7B can be accomplished entirely by other hardware configurations or even largely by means of software. A software implementation will be especially useful when it is desired to have more flexibility to meet changing traffic conditions or for other reasons modify various aspects of the traffic handling and housekeeping functions.

As shown in FIG. 7A, the ground relay station 20 includes a receiver 20 that receives incoming signals with an antenna 66, a diplexer 67 and a preamplifier 68 and filter/demodulator 60A in input module 61, all of which are designed to provide a very low noise figure for the receiver. This configuration is chosen for a reason. The output of the amplifier 68 contains all FDM signals received at station 20 and there is one module 61 per transmitting terminal station 22. All signals are applied to filter/demodulators 60a in the input modules 61, each filter/demodulator 60a being tuned exclusively to receive the signals from a different one of the terminal stations 22 (FIG. 1).

In FIGS. 7A and 7B we have illustrated in detail only a single input module 61, the other receiver modules 61 being of the same design. Similarly we have detailed the message processing and transmission circuitry of a single channel, the same circuitry being used in the other channels. Various timing details for logic operations are conventional and have therefore been omitted for the sake of clarity. The timing details are easily provided by one skilled in the art. The suffixes A, B and C designate the respective channels, corresponding ultimately with the beams A, B and C of the satellite antennas (FIG. 1).

With further reference to FIG. 7A, each of the modules 61 also includes an error correction decoder 72 followed by a second error correction decoder 74 for the packet framing and addresses, both of which are well known in the art. In transmission, well known error correction codes are used so that decoders 72 and 74 can correct transmission errors. A shift register 76 is loaded serially with the fully decoded and corrected message packet bit strings thus retrieved from the serially received incoming signals. A second register 78 is connected for parallel transfer of a complete message packet from the register 76. A decoder 80 is connected to sense the presence of a leading packet delimiter (PDL) in the leading end of the register 76 and provide a signal when a complete packet is stored in register 76. The decoder 80 also decodes the channel-identifying bits in the destination address in each packet and provides a signal on one of three output leads. This signal indicates the satellite antenna to be used in sending the packet in register 76 to the terminal station 22 associated with the suscriber that is receiving the message packet.

When the decoder 80 detects a leading packet delimiter in the register 76, indicating receipt of a full packet, it emits an output signal causing the contents of the register 76 to be loaded in parallel format into the register 78. The signal on the one of three output leads from decoder 80 sets a flag flip-flop 82A, 82B or 82C corresponding to the channel identified by the channel-identifying bits in the destination address in the message packet as mentioned previously. The output from the operated one of the flip-flops 82A, B, or C enables one of the two inputs of the corresponding one of AND gates 84A, 84B or 84C. Upon the second input of the corresponding one of AND gates 84A, B, or C being energized, as described hereinafter, the message packet in register 78 is passed to the equipment in FIG. 7B for retransmission.

The outputs of the modules 61 are sorted according to the output channels A, B, and C of the station 20 associated with the terminal stations 22 for the subscribers who are to receive the messages. Theysorted messages are then stored temporarily in buffersmemories 62 in FIG. 7B associated with the respective output channels. The contents of each of the memories 62 are retrieved from the memory on a first-in, first-out basis and transmitted by means of transmitters 64 as is described further in the specification. More specifically, there is a distributor 85 associated with each of satellite antennaes and each is used to steer all message packets in all the input modules 61 to the corresponding transmission channel A, B, or C to reach the proper destination. Thus, distributor 85A has an output associated with AND gate 84A in each of the input modules 61, distributor 85B has an output associated with AND gate 84B in each module 61, and distributor 85C has an output associated with AND gate 84C in each module 61. In response to repetitive clock signals, from clock 104 (connection not shown but known to one skilled in the art), each of distributors 85A, B and C sequentially energizes its output terminals. Assume, for example, that a packet contained in the register 78 of the illustrated module 61 in FIG. 7A is destined for transmitting channel A. The flip-flop 82A in has already been set, as previously described, to enable the one input of AND gate 84A. When the output terminal of the distributor 85A connected to the second input of AND gate 84A is energized, gate 84A will pass a transfer signal enabling AND gate 86A, which is made up of a plurality of AND gates, to apply the contents of the register 78 in parallel to a bus 87A. In this manner, the contents of each of modules 61 that are destined for channel A will be sequentially gated to bus 87A.

Similarly, the message packets stored in each of modules 61 that is destined for channel B will be sequentially gated to bus B. The same operation applies to bus C for channel C. The trailing edge of the transfer signal output from AND gate 84A will cause a register 88A in FIG. 7B to receive the packet from the bus 87A and will also reset the flag flip-flop 82A.

The apparatus shown in FIG. 7B corresponds to output module 71 in FIG. 5, and three output modules are provided; one for each of transmission channels A, B, and C. The apparatus shown in FIG. 7B is for the output module 71 associated with channel A. The other modules, not shown, are identical and operate in the same manner.

In FIG. 7B, the stages in the register 88A containing the terminal station identifying bits in the destination address therein connected to a rate memory 89A to address the contents of that memory. Each location in the memory 89A contains attenuation information for a terminal station 22A associated with beam RA (antenna 10) for channel A (FIG. 1) and is identified by the destination address. In the simplest arrangement, this information is encoded in a one out of three code, each of the three code combinations designating the three previously discussed data rates for transmission to the corresponding terminal station 22A.

Thus when the memory 89A is addressed as described, the system retrieves a code indicating the data rate for the terminal station 22A to which the data packet in the register 88A is to be transmitted.

The data rate information retrieved from the memory 89A is loaded into the right-hand end of a register 90A (FIG. 7B), immediately adjacent to the message packet, which is transferred from the register 88A to the register 90A at the same time. The message packet, together with the three bits indicating the data transmission rate, constitutes a data word which is then loaded into the buffer memory 62A from which it is later retrieved on a first-in first-out basis for transmission.

The memory 62A may, for example, be a conventional random access memory connected for access from two separate devices. An arrangement of this type is described in U.S. Pat. No. 3,710,324, for example. The register 90A serves as one of these access "devices" and serves to access memory 62A to input message packets thereto. Register 94A, whose function will be described, serves as the other access "device" and serves to access memory 62A to read the packets therefrom for transmission. The registers 90A and 94A are connected to the memory 62A by means of a bus 92A. Associated with the register 90A is a counter 96A having a capacity equal to the number of addresses in the memory 62A. The counter 96A serves as an address generator designating successive locations in the memory 62A for successive transfers of message packets from the register 90A to the memory.

More specifically, each time the register 90A is loaded with a message packet from ones of the input modules 61, the pulse that times the transfer also serves as a signal initiating transfer of the contents of the register 90A to the memory 62A location designated by the contents of the counter 96A. The pulse that loads the register 90A also serves to increment the counter 96A, so that successive words from the register 90A are stored in successive addresses in the memory 62A. As previously discussed register 94A retrieves the data words stored in the memory 62A on a first-in first-out basis and passes the message packet portions of these words on to transmitter 64A. Associated with the second "access" register 94A is a counter 98A, which is similar to the counter 96A, and serves as an address generator for sequentially reading data words out of memory 62A to be stored in register 94A. The message packets forwarded from memory 62A to register 94A are transferred in parallel, as described below, to a shift register 100A. The signal causing each such transfer increments the counter 98A as well to commence reading out the next data word from memory 62A. The transfers into and out of the memory as described above may be directly controlled by circuitry of the type described in U.S. Pat. No. 3,710,324.

Accordingly, the data packets received by the register 98A are fed through the memory 62A in succession to the register 94A, the memory 62A serving as a buffer accommodating short term variations between the rate at which the channel message packets are received by the input modules 61 and then placed in memory 62A and the rate at which they are retransmitted by the transmitter 64A as described hereinafter. There are situations when the apparatus of FIG. 7B is reading out data words from memory 62A and retransmitting the message packets contained therein faster than message packets are being input to memory 62A from the multiple input units 61. In this case, when the last data word is read out of memory 62A under control of counter 98A and register 94A, memory read-out is stopped as now described.

A comparator 102A, that compares the contents of the counters 96A and 98A, assures that, with respect to any specific location in the memory 62A, a retrieval operation always follows a loading operation (assuming that operation begins with the counter 98A equal to or behind the counter 96A). If, when a retrieval operation is initiated, the contents of these counters are equal, the comparator 102A emits an inhibit signal to register 94A that delays retrieval until a writing operation is completed placing a data word in buffer memory 62A.

Backing up to the process of writing data words in memory 62A, the leading and trailing packet delimiters of the message packet to be stored may be stripped from the packets before the packets are loaded into the memory 62A in order to conserve memory space. The delimiters can then be re-attached automatically when the packets are retrieved from the memory by register 94A and loaded into the shift register 100A.

Each time a message packet read out of memory 62A is loaded into the shift register 100A via register 94A, it is shifted to the right, by clock pulses from a central clock 104 to provide a serial data signal to the transmitter 64A. When a message packet in register 108 has been serially shifted out of the register the next message packet contained in the register 94A is then moved into the register 100A immediately behind the first packet, so that ordinarily an unbroken string of message packets is delivered to the transmitter 64A. The manner in which this is accomplished is as follows.

Assume that a leading and a trailing packet delimiter (FIG. 4) each contain m bits. The number of bit stages in the shift register 100A then equals the message packet length, plus an 2m- stage extension for delimiters, plus an additional extension in which error correction encoding is applied to the message packets, plus an extension for designating the subscriber who is to receive the message. A decoder 106, connected to sense the contents of the last of the m stages of the trailing packet delimiter, provides an output signal whenever a trailing packet delimiter appears in those stages. This output signal causes the next clock pulse supplied to the shift register 100A to load into the register 100A the next message packet contained in the register 94A at the same time that the last bit of the trailing packet delimiter moves into the m- stage extension.

At the same time as a data word is transferred from register 94A to shift register 100A, the previously discussed three-bit transmission rate code added by rate memory 89A to the right-hand end of the data word now contained in the register 94A is loaded into the left-hand stage of a shift register 108. This rate code is part of the data word read out of memory 62A but is not transferred to register 100A along with the message packet. The register 108 is shifted by the same clock pulses that shift the contents of the register 100A out to transmitter 64A. Register 108 has a number of stages such that when the first bit of a message packet reaches the rightmost stage of the register 100A, the rate code reaches the right hand end of the register 108. The rate code in register 108 thereupon triggers a multistable circuit 110 to provide an output signal at one of three terminals corresponding to the data transmission rate specified by the rate code. These output terminals of the multistable circuit 110 are connected to AND gate 116, 118 and 120 to apply the proper clock signals to register 100A to shift the message packet out of register 100A at the rate specified for transmitting to the appropriate terminal station 22 as now described in detail.

The shift rate for the registers 100A and 108 must correspond with the selected transmission rates for the respective message packets. For this purpose we provide the clock 104 with three shift pulse outputs having the three requisite pulse repetition frequencies. These three clock 104 outputs are applied to one of the two inputs of gates 116, 118 and 120, respectively, while the second input to these gates are enabled by the output of the multistable 110 to apply the appropriate set of shift pulses to the shift registers 100A and 108.

Thus the message packets are retrieved in order from the memory 62A and transmitted in rapid succession at data transmission rates corresponding to the atmospheric propagation conditions associated with the respective terminal stations 22 that are to receive the packets.

The message packets shifted out of Register 100A are applied to a transmitter 64A which generates a radio frequency signal for transmission in a manner well known in the art.

The output of the transmitter 64A passes through a triplexer 111 that combines it with the outputs of the transmitters in the other channels. The output of the triplexer 111 in turn passes through the diplexer 67 to the antenna 66 for propagation to the satellite relay.

Turning now to describe how the equipment at control relay station 20 determines at what rates data must be transmitted.

As shown in FIG. 7B, a counter/distributor 122 responds to suitable pulses from the clock 104 and, also known in the art as a scanner sequentially enables conventional AND gates (not shown) in gating circuit 125 to connect the filter/demodulators to a signal strength quantizer 124. The quantizer 124 is basically an analog-to-digital converter and quantizes the signal strengths of the signals received by the respective filter/demodulators 60a into three levels according to the criteria used for the transmission rates from the transmitters 64. The output of the quantizer 124 is in the form of the transmission rate code discussed above.

The counter distributer 122 also provides address signal outputs for the rate memory 89A corresponding to the filter/demodulator to which the quantizer 124 is connected. Whenever the filter/demodulator 60 to which the quantizer 124 is connected is receiving a message and thus has a signal that can be quantized into a digitial transmission rate signal by the quantizer 124, a sensor 126 senses the presence of the quantized rate signal and provides a signal that causes the output of the quantizer 124 to be loaded into the memory 89A location designated by the address generated by the counter/distributor 122.

The memory 89A may be of the type and may be arranged with the quantizer 124 and register 88A in an arrangement like that used for the memory 62A, so that the storage and retrieval operations of the memory 89A can be suitably interleaved. Counter/distributor 122 accesses memory 89A to place quantized transmission rate information into the memory while register 88A accesses memory 89A with the address portion of the message packet in register 88A to read out the stored transmission rate information.

A master oscillator 130 in the ground control station serves as a basic frequency generator for the clock 104 and also the transmitters 64A. Also, it provides a basic frequency reference for the entire system as now described.

Thus, as shown in FIG. 2, each of the terminal station receivers 52 includes synchronous demodulators 140, 142 and 144 for demodulating signals received from the control station 20 at the three different data transmission rates discussed above. The demodulators 140–144 are keyed by the output of a master clock 146 to be properly synchronized to the three message packet transmission rates. The clock 146 in turn comprises a voltage-controlled oscillator 148 and a frequency synthesizer 150 which function and cooperate in a well known manner. The synthesizer 150 derives, from the output of the oscillator 148 a set of frequencies corresponding to the three data rates from the control station 20. The oscillator 148 is connected in a conventional phase lock loop comprising the demodulators 140-144 and phase lock circuitry indicated at 152.

There will almost always be a transmission on one of the three frequencies to which the receiver 52 is tuned. Otherwise the control station can be arranged to make such transmissions even when there are no messages to be transmitted. Therefore, there will almost always be a phase/frequency controlling signal in the phase lock loop 152. This synchronizes the oscillators at the control relay station 20 and the terminal stations 22 and makes for accurate control of the frequency and phase of the oscillator 148 at relatively low cost.

Still referring to FIG. 2, the output of the oscillator 148 is also applied to a frequency synthesizer 153 which provides the carrier frequency for the transmitter 32 and also provides the phase and frequency for modulation in the transmitter. Oscillator 148 also provides clock signals for data shifting and timing in the distribution and format unit 24. This in turn simplifies detection and demodulation in the receivers at the ground relay station 20 (FIG. 7), since the reference signals for those purposes are derived ultimately from the oscillator 130 at that station.

We have not described any of the various redundancy and internal checking procedures that can be used to upgrade system reliability, since they are not a part of the present invention. However, it should be noted that one factor in reliability is the sun. Twice each year, the satellite will be between the sun and the ground relay station 20. At those times background radiation from the sun will materially degrade the quality of transmissions from the satellite to the control station 20. For this purpose it will ordinarily be desirable to duplicate the ground relay station 20 with an identical station located at least 250 miles away. Then, when the position of the sun is such as to unduly degrade operation of one of the ground relay stations, the control function can be transferred to the other station. Moreover, the ground relay function can be transferred whenever atmospheric conditions in the neighborhood of one of the ground relay stations cause undue attenuation of the signals to and from that station or in case of equipment failure at that station.

As mentioned above, our system is readily expanded with full connectivity between "old" and "new" subscribers. This is a direct result of the use of ground relay stations in a two-hop arrangement. Specifically, the entire system can be duplicated with a second satellite to provide for a second set of subscribers. The ground relay stations for the added system are positioned close enough to those of the pre-existing system for a low-cost cable link between the two sets of ground relay stations. Communications between subscribers of the added and pre-existing systems are then a simple matter of routing the messages over that link.

In a single hop system, the only way the two sets of subscribers could communicate would be for each ground terminal station to be duplicated, with one antenna pointed to each satellite. In general, the satellites would be many beamwidths apart, so that a single antenna could not be used for both beams.

Figure 8:
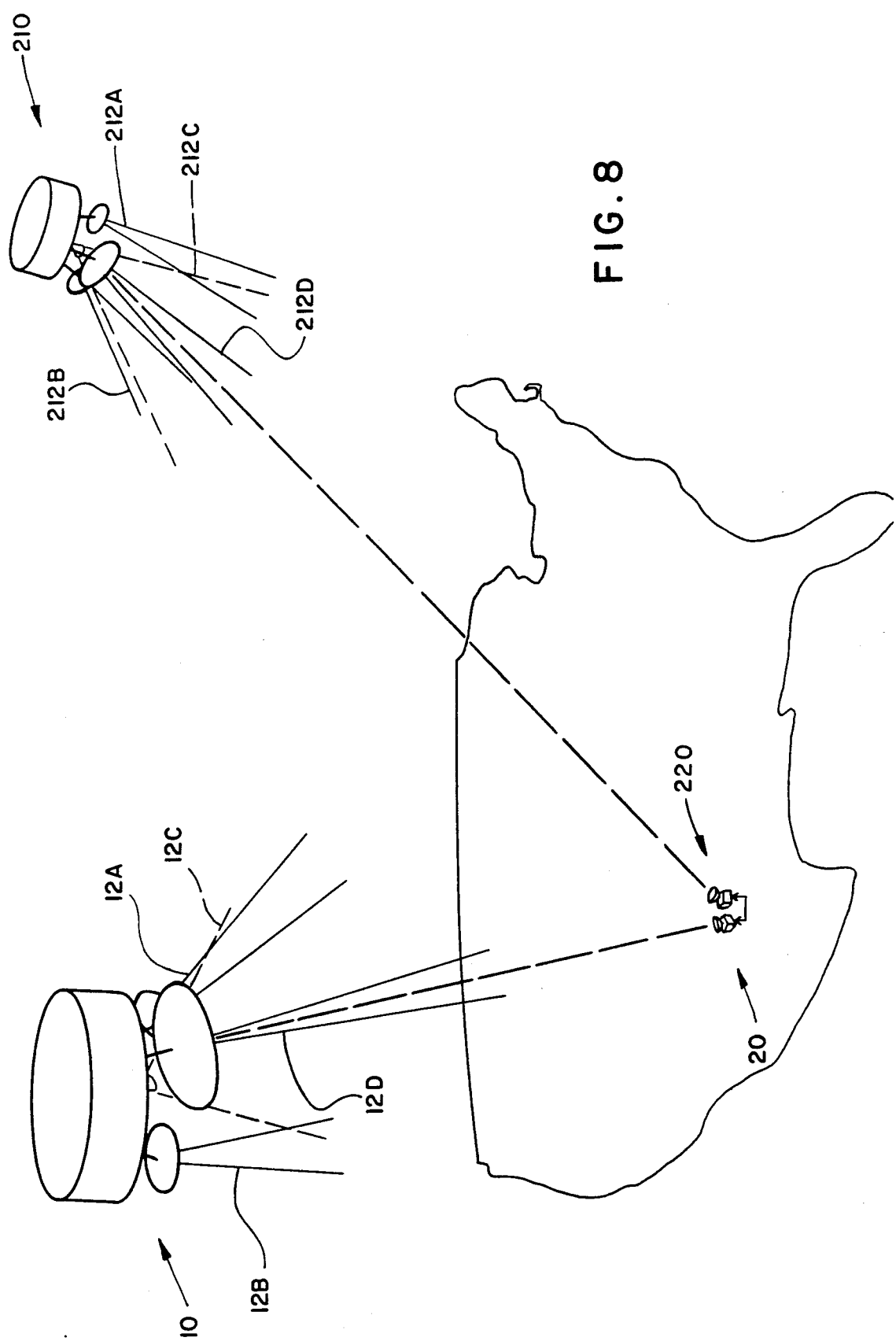
FIG. 8 is a diagram of a multiple-satellite system embodying the invention.

An expanded system is shown in FIG. 8. It includes, the satellite relay 10, ground relay station 20 and terminal stations 22 and in addition, a second satellite relay 210, a second ground relay station 220 and a second set of ground terminal stations. The depicted satellite relay 210 has the same antenna beam arrangement as that of the satellite relay 10, although this is not necessary. Indeed, a different geographic distribution of subscribers to the expanded system may well dictate a substantially different beam arrangement for the satellite relay 210. A cable between the stations 20 and 220 provides the requisite link between the subscribers that communicate through these stations. In operation, when a ground terminal of the pre-existing group of ground stations addresses a terminal in the added group, the ground relay station associated with the first satellite, rather than transmitting back to the first satellite transmits the named signal over the cable to the second ground relay station which then sends the second hop signal to the satellite associated with the added group of ground terminals.

In the expanded system, the satellite relays 10 and 210 are spaced apart by more than the beam widths of the ground terminal stations. The two satellite relays and the respective sets of ground stations associated with them can then operate in the same frequency channels without interference.

What is claimed is:

1. A communication system in which communications among ground terminal stations are relayed through an earth-orbiting satellite and a ground relay station, said system comprising
    a set of ground terminal stations linked to subscribers, each terminal station including
        (1) a transmitter for transmitting outgoing messages independent of control from said ground relay station,
        (2) a receiver for receiving incoming messages,
    an orbiting satellite relay including means for relaying earthward transmissions from the ground stations in the system, said ground relay station including
        (1) means for receiving the message transmissions from said terminal stations relayed by said satellite relay, and
        (2) means for processing the received messages according to message destination and retransmitting them to said satellite relay, whereby all messages transmitted from each terminal station are relayed by the satellite relay to the ground relay station and then relayed from the ground relay station through the satellite relay to the terminal stations connected to the subscribers who are to receive the messages.

2. The system defined in claim 1 in which
    each terminal station transmits on only a single transmit frequency unique to a set of terminal stations, and
    said satellite relay includes transponding means having a bandwidth accommodating all of the terminal station transmitting channels and relaying transmissions in said channels to said ground relay station.

3. The system defined in claim 2 in which said ground relay station includes means for rearranging incoming messages from said terminal stations into a serial format and retransmitting said messages on a time-division multiplex basis.

4. The system defined in claim 3
    in which said messages are transmitted in digital form from said ground terminal stations, and
    including means at said ground relay station for demodulating the messages received at that station and further means for remodulating the transmissions from that station with the demodulated messages.

5. The system defined in claim 3 in which the ground relay station includes
   means for monitoring the atmospheric attenuation conditions associated with the respective terminal stations, and
   means for regulating the data rates of transmissions to the respective terminal stations according to the attenuation conditions.

6. The system defined in claim 3 in which
   the terminal stations are arranged in groups,
   the ground relay station includes means for sorting incoming messages according to the groups to which the terminal stations that are to receive messages belong, and
   said retransmitting means includes means for transmitting the messages to each group of terminal stations in a separate time-division multiplex arrangement.

7. The system defined in claim 3 and further including
   means for monitoring the atmospheric attenuation conditions associated with the respective terminal stations, and
   means for regulating the data rates of transmissions from the respective terminal stations according to the attenuation conditions.

8. The system defined in claim 2 in which said ground relay station includes
   means for monitoring the atmospheric attenuation conditions associated with the respective terminal stations, and
   means for regulating the effective signal energy of transmissions to the respective terminal stations according to the attenuation conditions.

9. The system defined in claim 2 in which
   said satellite relay includes
   a plurality of antennas and
   means for sorting according to frequency the signals received from said ground relay station and applying them to said antennas for transmission therefrom in accordance with their frequencies,
   each of said terminal stations is tuned to receive the signals from one of said satellite relay antennas, and
   means in said ground relay station for selecting, for the messages transmitted therefrom, carrier frequencies according to the satellite relay antennas from which the respective terminal stations to which the messages are addressed receive signals from the satellite relay.

10. The system defined in claim 9 in which said satellite relay antennas have beams covering different areas of the earth's surface.

11. The system defined in claim 2 and further including
    means for monitoring the atmospheric attenuation conditions associated with the respective terminal stations, and
    means for regulating the effective signal energy of transmissions to the respective terminal stations according to the attenuation conditions.

12. The system defined in claim 2 and further including
    means for monitoring the atmospheric attenuation conditions associated with the respective terminal stations, and
    means for regulating the effective signal energy of transmissions from the respective terminal stations according to the attenuation conditions.

13. The system defined in claim 1 in which said retransmitting means in said ground relay station transmits in a time-division multiplex arrangement.

14. The system defined in claim 13 in which the ground relay station includes
    means for monitoring the atmospheric attenuation conditions associated with the respective terminal stations, and
    means for regulating the data rates of transmissions to the respective terminal stations according to the attenuation conditions.

15. The system defined in claim 13 in which
    the terminal stations are arranged in groups,
    the ground relay station includes means for sorting incoming messages according to the groups to which the terminal stations that are to receive messages belong, and
    said retransmitting means includes means for transmitting the messages to each group of terminal stations in a seperate time-division multiplex arrangement.

16. The system defined in claim 13 and further including
    means for monitoring the atmospheric attenuation conditions associated with the respective terminal stations, and
    means for regulating the data rates of transmissions from the respective terminal stations according to the attenuation conditions.

17. The system defined in claim 1 in which
    each ground terminal station transmits messages on a carrier frequency that is different from the carrier frequencies on which the other ground terminal stations receive messages, and
    said ground relay station includes switching means for changing the carrier frequencies of incoming messages to frequencies corresponding to the receiving frequencies of the terminal stations to which the messages are addressed.

18. The system defined in claim 1
    in which said messages are transmitted in digital form from said ground terminal stations, and
    including means at said ground relay station for demodulating the messages received at that station and further means for remodulating the transmissions from that station with the demodulated messages.

19. The system defined in claim 1 in which said ground relay station includes
    means for monitoring the atmospheric attenuation conditions associated with the respective terminal stations, and
    means for regulating the effective signal energy of transmissions to the respective terminal stations according to the attenuation conditions.

20. The system defined in claim 1 in which
    said satellite relay includes
    a plurality of antennas and
    means for sorting according to frequency the signals received from said ground relay station and applying them to said antennas in accordance with their frequencies.
    each of said terminal stations is tuned to receive the signals from one of said satellite relay antennas, and
    means in said ground relay station for selecting, for the messages transmitted therefrom, carrier frequencies according to the satellite relay antennas from which the respective terminal stations to which the messages are addressed receive signals from the satellite relay.

21. The system defined in claim 20 in which said satellite relay antennas have beams covering different areas of the earth's surface.

22. A system as defined in claim 1 including
a second set of ground terminal stations,
a second satellite relay, and
a second ground relay station arranged for communication among said terminal stations in said second set in the manner defined in claim 1, and
a terrestial communications link between said ground relay stations to provide for communications between the terminal stations in the two sets thereof.

23. The system defined in claim 1 and further including
means for monitoring the atmospheric attenuation conditions associated with the respective terminal stations, and
means for regulating the effective signal energy of transmissions to the respective terminal stations according to the attenuation conditions.

24. The system defined in claim 1 and further including
means for monitoring the atmospheric attenuation conditions associated with the respective terminal stations, and
means for regulating the effective signal energy of transmissions from the respective terminal stations according to the attenuation conditions.

25. A communication system in which communications between ground stations are relayed through an earth-orbiting satellite and a ground relay station, said system comprising
a set of ground terminal stations linked to subscribers, each terminal station including
a transmitter for transmitting outgoing messages independent of control from said ground relay station, and
a receiver for receiving incoming messages,
a satellite having a plurality of antennas, each of said antennas being arranged and designated for communication with a different group of said terminal stations,
a ground relay station,
means in said satellite for relaying to the ground relay station messages transmitted by said terminal stations,
means in said ground relay station for processing the messages according to message destination relayed thereto and retransmitting the messages on different carrier frequencies according to the terminal station groups to which the messages are to be sent, and
means in said satellite relay for sorting the transmissions from said ground relay station according to the carrier frequencies thereof and retransmitting them through the respective antennas according to the carrier frequencies so as to retransmit to each ground terminal station through the antenna designated for communication with that ground terminal station.

26. A system as defined in claim 25 including
a second set of ground terminal stations,
a second satellite relay, and
a second ground relay station arranged for communication among said terminal stations in said second set in the manner defined in claim 18, and
a terrestial communications link between said ground relay stations to provide for communications between the terminal stations in the two sets thereof.

* * * * *